US008659274B2

(12) United States Patent
Hane (10) Patent No.: US 8,659,274 B2
(45) Date of Patent: Feb. 25, 2014

(54) SWITCHING POWER SUPPLY CIRCUIT IN A SYNCHRONOUS RECTIFICATION MODE FOR ALTERNATELY TURNING ON AND OFF A MAIN SWITCHING ELEMENT AND A SUBORDINATE SWITCHING ELEMENT

(75) Inventor: Norimasa Hane, Tokyo (JP)

(73) Assignee: Torex Semiconductor Ltd., Tokyo (JP)

( * ) Notice: Subject to any disclaimer, the term of this patent is extended or adjusted under 35 U.S.C. 154(b) by 457 days.

(21) Appl. No.: 13/007,870

(22) Filed: Jan. 17, 2011

(65) Prior Publication Data

US 2011/0175581 A1 Jul. 21, 2011

(30) Foreign Application Priority Data

Jan. 18, 2010 (JP) ................................. 2010-008600

(51) Int. Cl.
*G05F 1/565* (2006.01)
*G05F 1/569* (2006.01)

(52) U.S. Cl.
USPC ............................. 323/271; 323/276; 323/351

(58) Field of Classification Search
USPC ......... 323/222, 225, 268, 271, 275, 276, 282, 323/283, 284, 285, 349–351
See application file for complete search history.

(56) References Cited

U.S. PATENT DOCUMENTS

| 5,949,229 | A  | * | 9/1999  | Choi et al. ...................... 323/320 |
| 6,815,939 | B2 | * | 11/2004 | Umemoto et al. ............ 323/286 |
| 6,963,190 | B2 | * | 11/2005 | Asanuma et al. ............. 323/283 |
| 6,984,966 | B2 | * | 1/2006  | Kubota et al. ................. 323/282 |
| 7,038,436 | B2 | * | 5/2006  | Goto et al. ..................... 323/282 |
| 7,109,693 | B2 | * | 9/2006  | Yoshida et al. ............... 323/282 |
| 7,135,844 | B2 | * | 11/2006 | Hane et al. .................... 323/283 |
| 7,245,113 | B2 | * | 7/2007  | Chen et al. .................... 323/271 |
| 7,498,793 | B2 | * | 3/2009  | Xu ................................. 323/288 |
| 7,541,795 | B1 | * | 6/2009  | Smith et al. ................... 323/285 |
| 7,545,129 | B2 | * | 6/2009  | Hane et al. .................... 323/282 |
| 7,595,620 | B2 |   | 9/2009  | Sakai et al. |
| 7,638,994 | B2 | * | 12/2009 | Hane et al. .................... 323/285 |
| 7,675,276 | B2 | * | 3/2010  | Ohkawa et al. ............... 323/271 |
| 2003/0231012 | A1 | * | 12/2003 | Corva et al. .................... 323/285 |
| 2005/0258814 | A1 | * | 11/2005 | Chen et al. .................... 323/285 |

FOREIGN PATENT DOCUMENTS

| JP | 2006141191 A | 6/2006 |
| JP | 2006254577 A | 9/2006 |
| JP | 2007325477 A | 12/2007 |

* cited by examiner

*Primary Examiner* — Adolf Berhane
*Assistant Examiner* — Nusrat Quddus
(74) *Attorney, Agent, or Firm* — The Webb Law Firm (57) ABSTRACT

A switching power supply circuit comprises: a differential amplification stage for outputting an error signal representing a difference voltage between a preset reference voltage and a voltage based on an output voltage; an ON-time generation circuit for defining a period of time during which a main switching element is kept ON; a flip-flop circuit which is set by a set signal based on the error signal and reset by a reset signal being an output of the ON-time generation circuit; current information means for detecting current information representing a current flowing to a subordinate switching element; current information detecting means for supplying a current information detecting signal, which makes an adjustment based on the current information so as to delay the timing of the rise of the set signal, to the output side or the interior of the differential amplification stage; and current information holding means for holding the current information detected by the current information means at a moment when the subordinate switching element is turned on, and supplying a current information holding signal, which makes an adjustment so as to advance the timing of the rise of the set signal, to the output side or the interior of the differential amplification stage.

8 Claims, 7 Drawing Sheets

PRIOR ART

SWITCHING POWER SUPPLY CIRCUIT IN A SYNCHRONOUS RECTIFICATION MODE FOR ALTERNATELY TURNING ON AND OFF A MAIN SWITCHING ELEMENT AND A SUBORDINATE SWITCHING ELEMENT

The entire disclosure of Japanese Patent Application No. 2010-008600 filed Jan. 18, 2010 is expressly incorporated by reference herein.

TECHNICAL FIELD

This invention relates to a switching power supply circuit and, more specifically, to that useful when applied in performing PFM control in a synchronous rectification mode for alternately turning on and off a main switching element and a subordinate switching element by the output of a flip-flop circuit.

BACKGROUND ART

Figure 7:
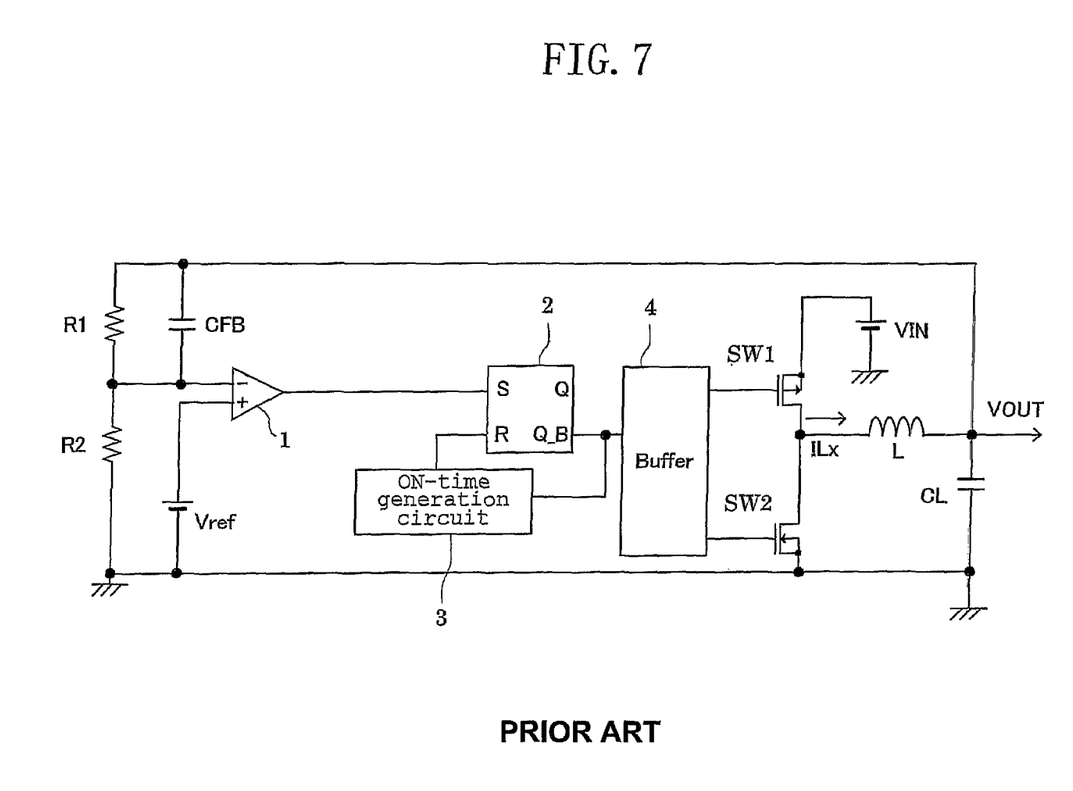
FIG. 7 is a block diagram showing a switching power supply circuit according to the conventional technology.

As a switching power supply circuit capable of a high speed action, a proposal has been made for the one configured to perform PFM control in a synchronous rectification mode for alternately turning on and off a main switching element and a subordinate switching element by the output of a flip-flop circuit, as shown in FIG. 7. As shown in this drawing, this switching power supply circuit is equipped with a comparator 1 which compares a voltage based on an output voltage VOUT (i.e., a voltage obtained by dividing the output voltage VOUT by a resistance ratio between the resistances of feedback resistors RFB1 and RFB2) with a reference voltage Vref; a flip-flop circuit 2 which is set by the output of the comparator 1; and an ON-time generation circuit 3 which resets the flip-flop circuit 2 at a time when a predetermined ON-time elapses after an output signal from the flip-flop circuit 2 has fallen. The output signal of the flip-flop circuit 2 is supplied to a main switching element (in the present example, a P-channel MOSFET) SW1 or a subordinate switching element (in the present example, an N-channel MOSFET) SW2 via a buffer circuit 4, whereby the main switching element SW1 or the subordinate switching element SW2 is alternately turned on and off to carry out synchronous rectification. In this manner, the output voltage VOUT is obtained which is a predetermined direct current voltage smoothed by a capacitor CL via a coil L connected between a drain of the main switching element SW1 and a drain of the subordinate switching element SW2.

In the above-mentioned switching power supply circuit, when a pulse signal supplied from an output terminal Q_B of the flip-flop circuit 2 to the main switching element SW1 and the subordinate switching element SW2 via the buffer circuit 4 is at an L-level, the main switching element SW1 is in the ON-state and the subordinate switching element SW2 is in the OFF-state. Thus, a coil current ILx flowing through the coil L gradually increases.

When, in this state, the ON-time defined by the ON-time generation circuit 3 has passed, the flip-flop circuit 2 is reset by a reset signal outputted from the ON-time generation circuit 3. As a result, the pulse signal supplied from the output terminal Q_B to the main switching element SW1 and the subordinate switching element SW2 via the buffer circuit 4 is at an H-level, and the main switching element SW1 is in the OFF-state and the subordinate switching element SW2 is in the ON-state. Consequently, the coil current ILx gradually decreases.

As the coil current ILx decreases, the output voltage VOUT becomes less than the reference voltage Vref. At this time, the flip-flop circuit 2 is set, with the result that the main switching element SW1 enters the ON-state and the subordinate switching element SW2 enters the OFF-state. Consequently, the coil current ILx gradually increases. Simultaneously, the management or control of the ON-time by the ON-time generation circuit 3 is started. Afterwards, the same actions are repeated.

In FIG. 7, VIN denotes an input voltage, and CFB denotes a speed-up capacitor. As a prior art document which discloses a switching power supply circuit similar to that in FIG. 7, Patent Document 1 is present.

CITATION LIST

Patent Literature

Patent Document 1: JP-A-2006-141191

SUMMARY OF INVENTION

Technical Problem

In the switching power supply circuit according to the conventional technology, as described above, the voltage obtained by dividing the output voltage VOUT by the ratio between the resistance values of the feedback resistors RFB1 and RFB2 is compared with the reference voltage Vref by the comparator 1, and the flip-flop circuit 2 is set by the output of the comparator 1. By this measure, the on-off control of the main switching element SW1 and the subordinate switching element SW2 is exercised. If the ripple component of the output voltage VOUT is small, therefore, switching control in the flip-flop circuit 2 becomes unstable. That is, if the ripple component of the output voltage VOUT is small, the difference from the reference voltage Vref is so insufficient that the timing of setting of the flip-flop circuit 2 deviates from the position on the time base where it should be located. In synchronism with this deviation, there are also deviations in the timings of the rise and fall of the pulse signal supplied from the output terminal Q_B to the main switching element SW1 and the subordinate switching element SW2 via the buffer circuit 4, and a deviation in the timing of the rise of the reset signal fed out from the ON-time generation circuit 3. As a result, the output voltage VOUT becomes so unstable as to include undulations.

Such phenomena are more manifest in a case where a capacitor with low ESR (equivalent series resistance) is used as the capacitor CL, or when the switching frequency is increased.

The present invention has been accomplished in the light of the above-mentioned earlier technology. It is an object of the present invention to provide a switching power supply circuit which can be allowed to act stably even when a capacitor with low ESR is used or when the switching frequency becomes high.

Solution to Problem

A first aspect of the present invention for attaining the above object is a switching power supply circuit in a synchronous rectification mode for alternately turning on and off a main switching element and a subordinate switching element to convert a direct current input voltage into a direct current output voltage, comprising: a differential amplification stage for outputting an error signal representing a difference voltage between a preset reference voltage and a voltage based on the output voltage; an ON-time generation circuit for defining a period of time during which the main switching element is kept ON; a flip-flop circuit which is set by a set signal based on the error signal and reset by a reset signal being an output of the ON-time generation circuit; current information means for detecting current information representing a current flowing to the subordinate switching element; current information detecting means for supplying a current information detecting signal, which makes an adjustment based on the current information so as to delay a timing of a rise of the set signal, to an output side or an interior of the differential amplification stage; and current information holding means for holding the current information detected by the current information means at a moment when the subordinate switching element is turned on, and supplying a current information holding signal, which makes an adjustment so as to advance the timing of the rise of the set signal, to the output side or the interior of the differential amplification stage.

A second aspect of the present invention is the switching power supply circuit according to the first aspect, wherein the current information means outputs a first voltage representing the current information when the subordinate switching element is turned on, by a current detecting signal which becomes ON simultaneously with or immediately after turning-on of the subordinate switching element and which becomes OFF simultaneously with or immediately before turning-off of the subordinate switching element.

A third aspect of the present invention is the switching power supply circuit according to the second aspect, wherein the current information holding means holds a second voltage representing the current information when the subordinate switching element is turned on, by a current holding and detecting signal which becomes ON at a time when the current detecting signal becomes OFF, and which becomes OFF a predetermined short time after the current detecting signal becomes ON.

A fourth aspect of the present invention is the switching power supply circuit according to the second aspect, wherein the current information holding means holds a second voltage representing the current information when the subordinate switching element is turned on, by a current holding and detecting signal which becomes ON simultaneously with a time when the current detecting signal becomes ON, and which becomes OFF a predetermined short time after the current detecting signal becomes ON.

A fifth aspect of the present invention is the switching power supply circuit according to the third or fourth aspect, wherein the current information detecting means has a first MOSFET whose source is connected via a first resistor to a power supply procured beforehand, the first voltage is applied to a gate of the first MOSFET, and a drain of the first MOSFET is connected to the output side or the interior of the differential amplification stage, and the current information holding means has a second MOSFET whose source is connected via a second resistor to a power supply procured beforehand, the second voltage is applied to a gate of the second MOSFET, and a drain of the second MOSFET is connected to the output side or the interior of the differential amplification stage.

A sixth aspect of the present invention is the switching power supply circuit according to the third or fourth aspect, wherein the current information detecting means has a first transconductance amplifier to whose input side the first voltage is applied, and an output side of the first transconductance amplifier is connected to the output side or the interior of the differential amplification stage, and the current information holding means has a second transconductance amplifier to whose input side the second voltage is applied, and an output side of the second transconductance amplifier is connected to the output side or the interior of the differential amplification stage.

Advantageous Effects of Invention

According to the present invention, an adjustment is made so as to delay the rise of the set signal based on the current information detecting signal, namely, the real-time current information, and an adjustment is made so as to expedite the rise of the set signal based on the current information holding signal, namely, the current information delayed by the predetermined time. Thus, the error signal becomes a signal based on the effectively high difference voltage. In other words, a state equivalent to a state where the ripple component of the output voltage is sufficiently great. Consequently, even if the ripple component of the output voltage becomes small by use of a smoothing capacitor with low ESR, or even if the slew rate of the ripple component of the output voltage becomes relatively small as a result of an increase in the switching frequency, a predetermined switching action can be performed stably.

DESCRIPTION OF EMBODIMENTS

An embodiment of the present invention will now be described in detail with reference to the accompanying drawings.

Figure 1:
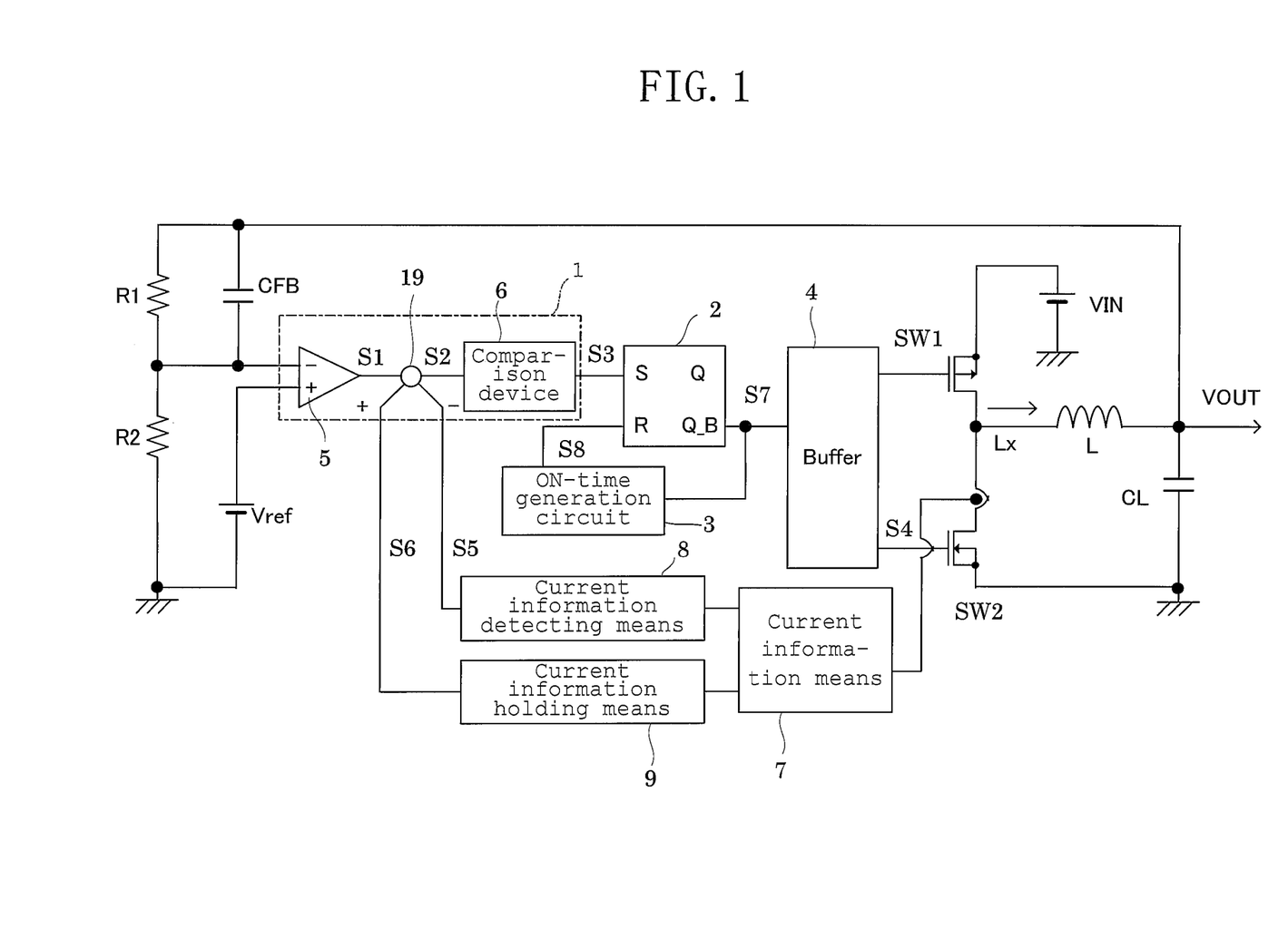
FIG. 1 is a block diagram showing a switching power supply circuit according to an embodiment of the present invention.

FIG. 1 is a block diagram showing a switching power supply circuit according to the embodiment of the present invention. As shown in this drawing, the switching power supply circuit according to the present embodiment is configured such that a function corresponding to that of the comparator 1 in the switching power supply circuit according to the conventional technology shown in FIG. 7 is performed by a differential amplification stage 5 and a comparator or comparison device 6, and a current information means 7, a current information detecting means 8 and a current information holding means 9 are further added. Other features are the same as those in the switching power supply circuit shown in FIG. 7. Thus, the same portions as those in FIG. 7 are assigned the same numerals as in FIG. 7, and duplicate explanations are omitted.

The differential amplification stage 5 outputs a first error signal S1 representing a difference voltage as the difference between a preset reference voltage Vref and a voltage obtained by dividing an output voltage VOUT by the ratio between the resistance values of feedback resistors RFB1 and RFB2. The comparison device 6 compares a second error signal S2 based on the first error signal S1 with a preset threshold voltage, and outputs a set signal S3 if the threshold value is exceeded.

The current information means 7 detects current information S4 representing a current flowing to a subordinate switching element SW2. The current information detecting means 8 supplies a current information detecting signal S5 to the output side or the interior of the differential amplification stage 5, the signal S5 making an adjustment based on the current information S4 so as to delay the timing of the rise of the set signal S3 as the output from the comparison device 6. The current information holding means 9 holds the current information S4 detected by the current information means 7 at the instant of the subordinate switching element SW2 being turned on, and supplies a current information holding signal S6 to the output side or the interior of the differential amplification stage 5, the signal S6 making an adjustment so as to advance the timing of the rise of the set signal S3.

Figure 5A:
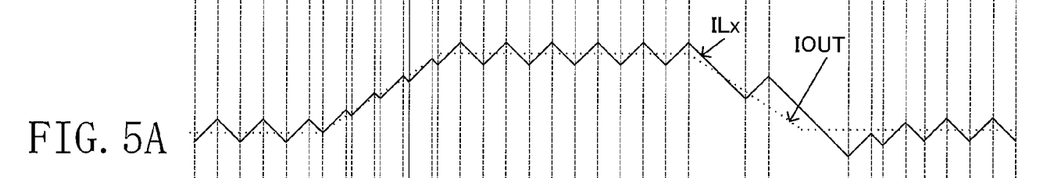
FIG. 5 is a waveform chart showing the waveforms of the respective portions during a transitional period of the working example shown in FIG. 2.
Figure 5B:
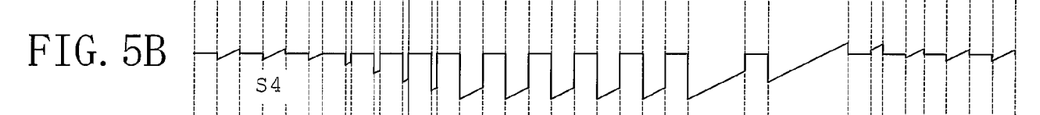
Figure 5C:
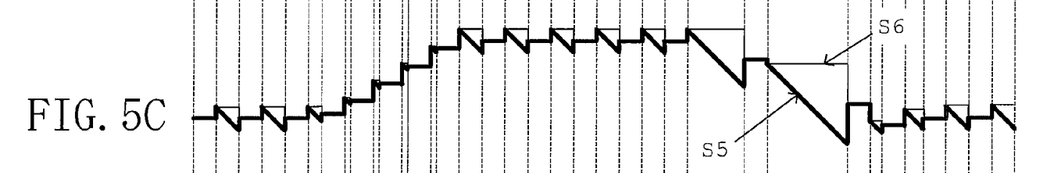
Figure 5D:
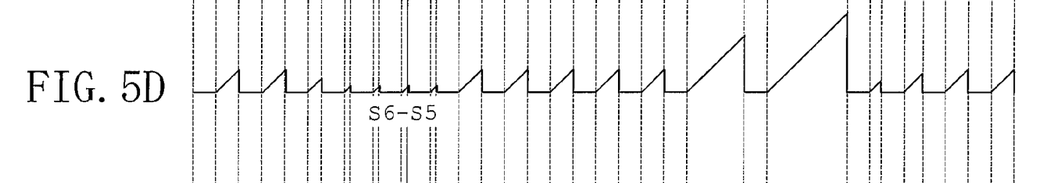

In the present embodiment, the expression "making an adjustment so as to delay the timing of the rise of the set signal S3" means to subtract the current information detecting signal S5 from the first error signal S1. The expression "making an adjustment so as to advance the timing of the rise of the set signal S3" means to add the current information holding signal S6 to the first error signal S1. Such addition and subtraction are performed by an adder 19. That is, the adder 19 adds a signal, which has been obtained by subtracting the current information detecting signal S5 from the current information holding signal S6, to the first error signal S1. The output of the adder 19 is the second error signal S2. As a result, the second error signal S2 corresponds to the ripple component of the output voltage VOUT which has been corrected to a state equivalent to the value amplified based on the difference between the current information holding signal S6 and the current information detecting signal S5, as shown in FIG. 5D.

In the comparison device 6, the second error signal S2 is compared with the predetermined threshold value and, at a time when the second error signal S2 exceeds the threshold value, the set signal S3 rises, and is supplied to an input terminal 0 of a flip-flop circuit 2. As a result, the flip-flop circuit 2 is set. At the same time that the flip-flop circuit 2 is set, a pulse signal S7 which is the output of its output terminal Q_B rises. This brings the main switching element SW1 into the ON state and the subordinate switching element SW2 into the OFF state, causing a coil current ILx to increase gradually.

The control or management of an ON-time in an ON-time generation circuit 3 is started simultaneously with the rise of the pulse signal S7 associated with the setting of the flip-flop circuit 2. The ON-time may be of a preset value, or may be of a value based on the output voltage VOUT and an input voltage VIN. Anyway, after the predetermined ON-time has elapsed, the flip-flop circuit 2 is reset by a reset signal S8 supplied from the ON-time generation circuit 3 to an input terminal R to allow the pulse signal S7 as the output of the output terminal Q_B to rise. As a result, the main switching element SW1 comes into the OFF state and the subordinate switching element SW2 comes into the ON state, causing the coil current ILx to decrease gradually.

According to the present embodiment described above, the value obtained by subtracting the current information detecting signal S5 from the current information holding signal S6 is added to the first error signal S1 to form the second error signal S2. Thus, the second error signal S2 becomes a signal based on an effectively high difference voltage. In other words, a state equivalent to a state where the ripple component of the output voltage VOUT is sufficiently great can be created. Thus, the timing of the rise, on the time base, of the set signal S3 formed based on the second error signal S2 can be rendered the predetermined one.

Figure 2:
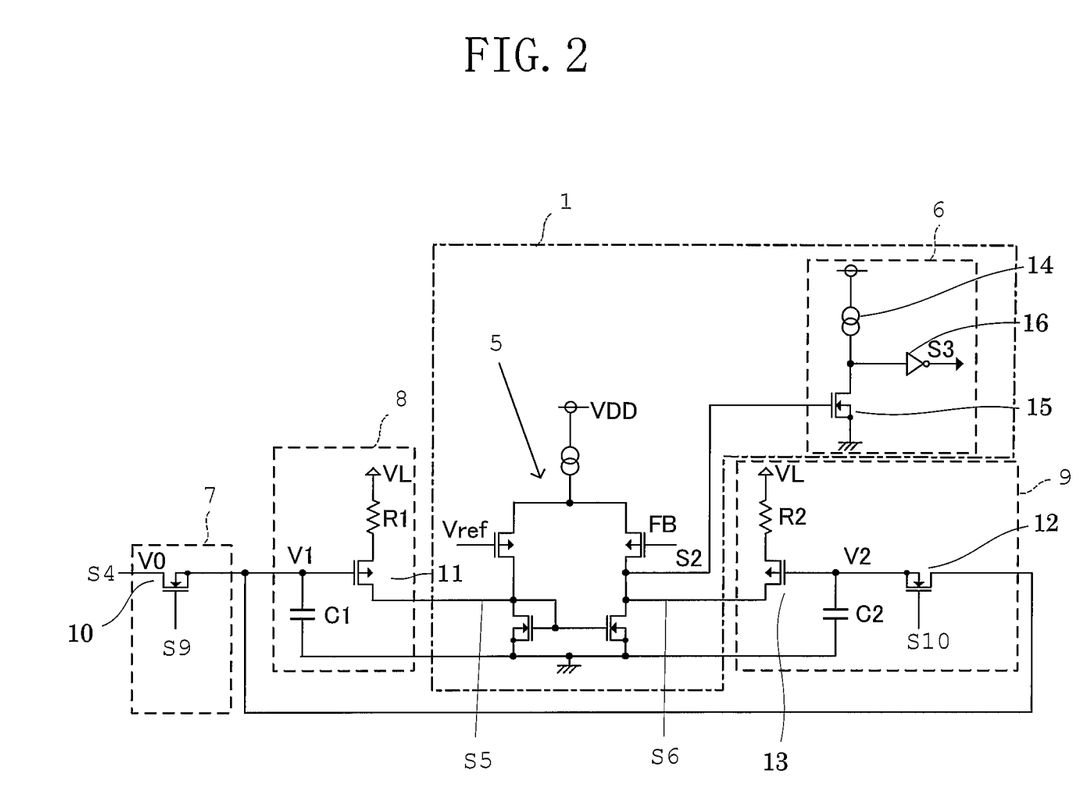
FIG. 2 is a circuit diagram showing a working example which is an example of the circuit configuration of principal parts in FIG. 1.

FIG. 2 is a circuit diagram showing a concrete working example in which the parts in FIG. 1, i.e., current information means 7, current information detecting means 8 and current information holding means 9, have been extracted. As shown in this drawing, the current information means 7 in the present example is formed from an N-channel MOSFET 10. The current information S4 representing the current flowing to the subordinate switching element SW2 is taken in from the drain side of the MOSFET 10 by a current detecting signal S9 supplied to the gate thereof.

The current information detecting means 8 holds a voltage based on the current information S4, which has been taken in by the current information means 7, as a first voltage V1 in a first capacitor C1. The current information detecting means 8 also has a P-channel first MOSFET 11 whose source is connected via a first resistor R1 to a power supply VL procured beforehand. The first voltage V1 held in the capacitor C1 is applied to the gate of the first MOSFET 11. As a result, a current conformed to the first voltage V1 which is the gate voltage of the first MOSFET 11 is supplied from the drain to the differential amplification stage 5 as the current information detecting signal S5.

The current information holding means 9 has an N-channel MOSFET 12 whose drain is connected to the output side of the current information means 7. The current information holding means 9 holds a second voltage V2 based on the current information S4, which has been taken in by the current information means 7, in a capacitor C2 by a current holding and detecting signal S10 supplied to its gate. The capacitor C2 holds the voltage based on the current information S4 when the current detecting signal S9 and the current holding and detecting signal S10 are both at the H level. The current information holding means 9 also has a P-channel second MOSFET 13 having a source connected via a second resistor R2 to a power supply VL procured beforehand. The second voltage V2 held in the capacitor C2 is applied to the gate of the second MOSFET 13. As a result, a current conformed to the second voltage V2 which is the gate voltage of the second MOSFET 13 is supplied from the drain to the differential amplification stage 5 as the current information holding signal S6.

The differential amplification stage 5 is constructed by utilizing a current mirror circuit. One current path of the current mirror circuit is supplied with the reference voltage Vref and the current information detecting signal S5, and the other current path of the current mirror circuit is supplied with a feedback voltage FB, which has been obtained by dividing the output voltage VOUT by the ratio between the resistance values of the feedback resistors RFB1 and RFB2, and the current information holding signal S6. An output signal is outputted from the other current path side of the current mirror circuit. As a result, the error signal S2 as the output signal of the differential amplification stage 5 becomes a signal which is the sum of the difference between the current information holding signal S6 and the current information detecting signal S5 and the difference between the feedback voltage FB and the reference voltage Vref. The comparison device 6 has an N-channel MOSFET 15 whose drain side is connected to a constant-current power supply, and feeds out the set signal S3 from the drain side via an inverter 16. As the threshold value of the comparison device 6, the threshold value of the MOSFET 15 can be utilized. In this case, the comparison device 6 outputs the set signal S3 via the inverter 16 at a time when the error signal S2 exceeds the threshold value of the MOSFET 15.

FIG. 3 is a waveform chart showing the waveforms of the respective portions in FIG. 2 based on the coil current ILx flowing through the coil L. As shown in FIG. 3A of this drawing, the coil current ILx repeats increases and decreases in accordance with the turning-on and turning-off of the main switching element SW1. As a result, the current information S4 shown in FIG. 3B of the drawing becomes a signal representing a current gradually decreasing with respect to the negative direction during the period in which the coil current ILx gradually decreases.

Figure 3A:
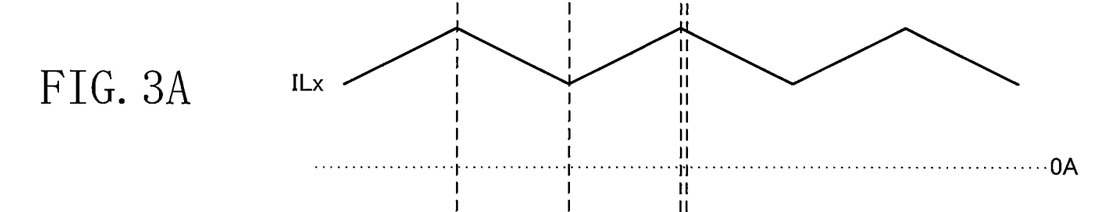
FIG. 3 is a waveform chart showing examples of the waveforms of respective portions in FIG. 2.
Figure 3B:
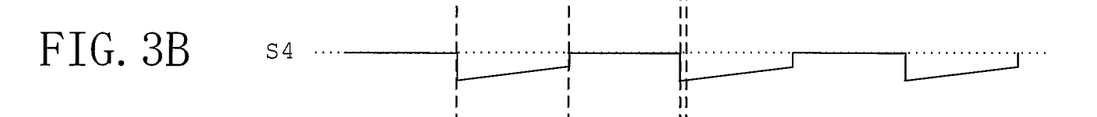
Figure 3C:
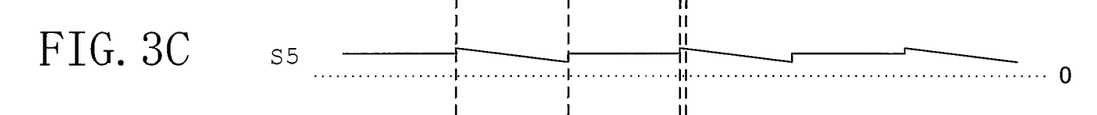
Figure 3D:
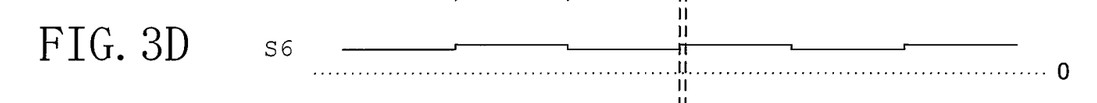
Figure 3E:
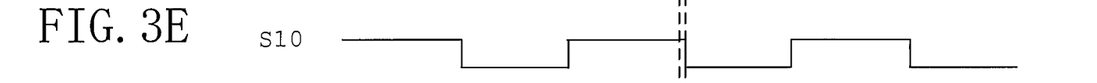
Figure 3F:
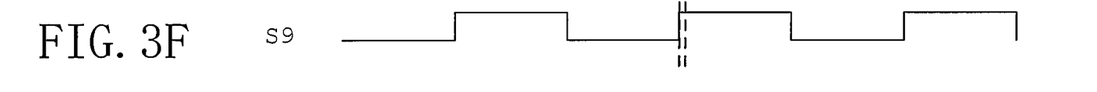

The current detecting signal 9 shown in FIG. 3F is a signal which is rendered ON (brought to the H level) simultaneously with (or immediately after) the turning-on of the subordinate switching element SW2, and which is rendered OFF (brought to the L level) simultaneously with (or immediately before) the turning-off of the subordinate switching element SW2. Thus, in synchronization with the ON time of the subordinate switching element SW2, the MOSFET 10 of the current information means 7 (see FIG. 2) is turned on, and the current information S4 in this ON state is held in the capacitor C1 as the first voltage V1. As a result, the current information detecting signal S5 shown in FIG. 3C becomes a signal representing a current flowing from the first MOSFET 11 of the current information detecting means 8 having the first voltage V1 as the gate voltage, the current gradually decreasing similarly to the current information S4 during the period in which the coil current ILx gradually decreases.

The current holding and detecting signal S10 shown in FIG. 3E is a signal which is turned on (brought to the H level) at a time when the current detecting signal S9 is turned off (brought to the L level), and which is turned off (at the L level) a predetermined short time after the current detecting signal S9 is turned on (brought to the H level). During the period in which the current holding and detecting signal S10 is in the ON state (at the H level), it turns on the MOSFET of the current information holding means 9 (see FIG. 2). As a result, the current information S4 when the current detecting signal S9 and the current holding and detecting signal S10 are both in the ON state (at the H level) is held in the capacitor C2 as the second voltage V2. That is, the second voltage V2 serves as the current information S4 at a moment when the subordinate switching element SW2 is turned on. Consequently, the current information holding signal S6 shown in FIG. 3D becomes a signal representing a constant current supplied from the second MOSFET 13 of the current information holding means 9 (see FIG. 2) having the second voltage V2 as the gate voltage.

The term "predetermined short time" refers to a period of time during which a voltage V0 representing the current information S4 supplied to the current information means 7, the voltage V1 of the capacitor C1, and the voltage V2 of the capacitor C2 become nearly equal. This period of time can be determined satisfactorily based on a time constant which is determined by the ON-resistances of the MOSFET 10 and the MOSFET 12 and the capacities of the capacitor C1 and the capacitor C2.

FIG. 4 is another waveform chart showing the waveforms of the respective portions in FIG. 2. FIG. 4 shows a case where the waveform of the current holding and detecting signal S10 in FIG. 4E is different from that shown in FIG. 3. That is, the current holding and detecting signal S10, as shown in FIG. 4E, is a signal which is on (at the H level) at the same time that the current detecting signal S9 is on (at the H level), and which is off (at the L level) after a lapse of the same predetermined short time as the one mentioned above. During the period in which the current holding and detecting signal S10 is in the ON state (at the H level), it turns on the MOSFET 12 of the current information holding means 9 (see FIG. 2). Consequently, the current information S4 at a moment when the subordinate switching element SW2 is turned on can be held in the capacitor C2 as the second voltage V2, as in the case shown in FIG. 3.

Figure 4A:
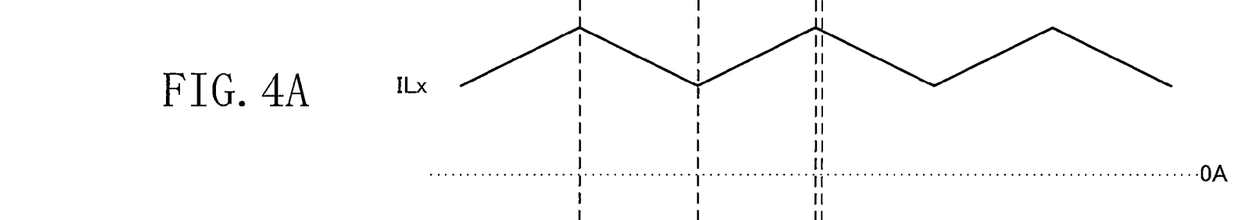
FIG. 4 is a waveform chart showing other examples of the waveforms of the respective portions in FIG. 2.
Figure 4B:
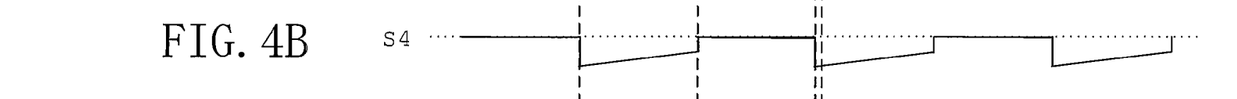
Figure 4C:
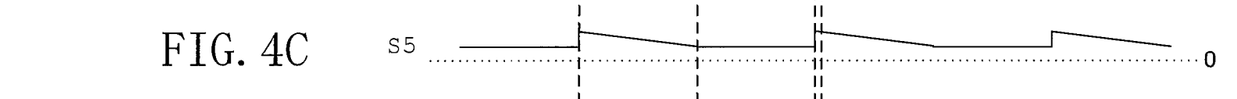
Figure 4D:
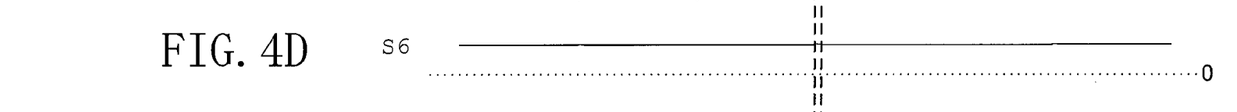
Figure 4E:
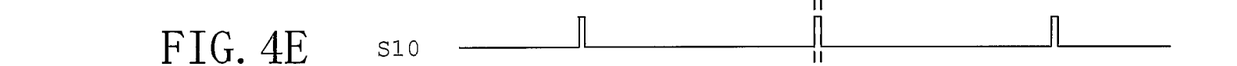
Figure 4F:
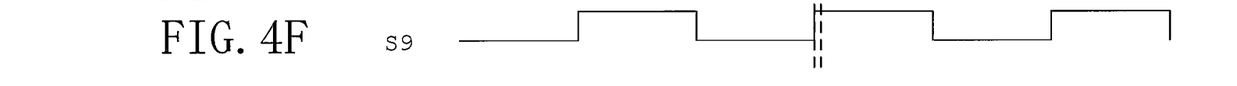

The waveforms of the coil current ILx shown in FIG. 4A, the current information S4 shown in FIG. 4B, and the current detecting signal S9 in FIG. 4F are exactly the same as those shown in FIG. 3, while the waveforms of the current information detecting signal S5 shown in FIG. 4C and the current information holding signal S6 shown in FIG. 4D are basically the same as those shown in FIG. 3.

FIG. 5 is a waveform chart showing the waveforms of the respective portions during the transitional period of the working example shown in FIG. 2. In this drawing, FIG. 5A represents the coil current ILx and the output current IOUT, FIG. 5B represents the current information S4, FIG. 5C represents the current information detecting signal S5 and the current information holding signal S6, and FIG. 5D represents a signal corresponding to the difference between the current information holding signal S6 and the current information detecting signal S5. As shown in FIG. 5, in the transitional state where the coil current ILx increases, the difference between the current information holding signal S6 and the current information detecting signal S5 narrows. In the transitional state where the coil current ILx decreases, however, this difference widens. In the steady state, on the other hand, the above difference levels off. The difference in each case is substantially added to the error signal S1 of the differential amplification stage 5 (see FIG. 2). As a result, the output current IOUT shifts to the steady state promptly, as shown in FIG. 5A.

Figure 6:
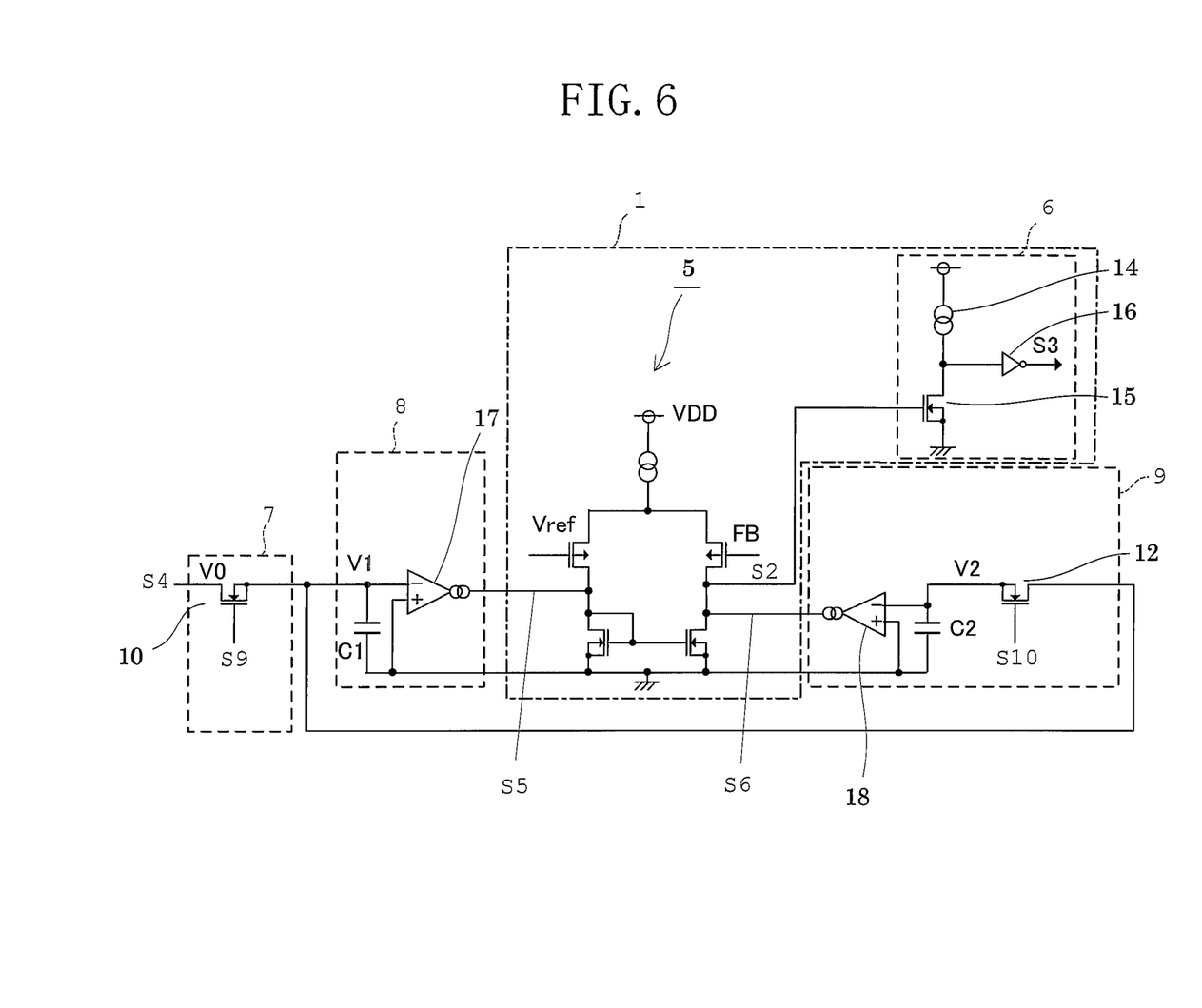
FIG. 6 is a circuit diagram showing another working example which is another example of the circuit configuration of the principal parts in FIG. 1.

FIG. 6 is a circuit diagram showing another concrete working example in which the portions in FIG. 1, i.e., the current information means 7, the current information detecting means 8, and the current information holding means 9, have been extracted. As shown in FIG. 6, the current information detecting means 8 and the current information holding means 9 in the present working example are different from those of the circuit shown in FIG. 2 in terms of the configurations of the portions for forming the current information detecting signal S5 and the current information holding signal S6. That is, the current information detecting means 8 of the present example has a first transconductance amplifier 17 to whose input side the first voltage V1 held in the capacitor C1 is applied, and the output side thereof is connected to the interior of the differential amplification stage 5. The current information holding means 9 has a second transconductance amplifier 18 to whose input side the second voltage held in the capacitor C2 is applied, and the output side thereof is connected to the interior of the differential amplification stage 5.

The working example describe above can also exhibit exactly the same actions and effects as those of the working example shown in FIG. 2.

In the working examples shown in FIGS. 2 and 6, the current information detecting signal S5 and the current information holding signal S6 are supplied to the interior of the differential amplification stage 5. However, these signals may be supplied to the output side of the differential amplification stage 5. Specifically, arrangements are made such that the adder 19 (see FIG. 1) is provided between the output side of the differential amplification stage 5 and the comparison device 6, and that in the adder 19, the current information detecting signal S5 is subtracted from the output of the differential amplification stage 5 (in this case, the error signal S1), and the current information holding signal S6 is added to the output of the differential amplification stage 5 (in this case, the error signal S1).

In the aforementioned embodiment, the difference between the current information holding signal S6 and the current information detecting signal S5 is added to the error signal S1 which is the output of the differential amplification stage 5, but this is not limitative. It is essential that the error signal S1 be adjusted by the current information holding signal S6 so as to expedite the rise of the set signal S3 and, simultaneously, the error signal S1 be adjusted by the current information detecting signal S5 so as to delay the rise of the set signal S3. A configuration fulfilling such conditions is included in the technical ideas of the present invention.

INDUSTRIAL APPLICABILITY

The present invention can be utilized effectively in industrial fields where various power supply circuits of semiconductor equipment are produced and marketed.

REFERENCE SIGNS LIST

1 Comparator
2 Flip-flop circuit
3 ON-time generation circuit
5 Differential amplification stage
6 Comparison device
7 Current information means
8 Current information detecting means
9 Current information holding means
17, 18 Transconductance amplifier
SW1 Main switching element
SW2 Subordinate switching element
S1, S2 Error signal
S3 Set signal
S4 Current information
S5 Current information detecting signal
S6 Current information holding signal
S7 Pulse signal
S8 Reset signal
S9 Current detecting signal

The invention claimed is:

1. A switching power supply circuit in a synchronous rectification mode for alternately turning on and off a main switching element and a subordinate switching element to convert a direct current input voltage into a direct current output voltage, comprising:
   a differential amplification stage for outputting an error signal representing a difference voltage between a preset reference voltage and a voltage based on the output voltage;
   an ON-time generation circuit for defining a period of time during which the main switching element is kept ON;
   a flip-flop circuit which is set by a set signal based on the error signal and reset by a reset signal being an output of the ON-time generation circuit;
   current information means for detecting current information representing a current flowing to the subordinate switching element;
   current information detecting means for supplying a current information detecting signal, which makes an adjustment based on the current information so as to delay a timing of a rise of the set signal, to an output side or an interior of the differential amplification stage; and
   current information holding means for holding the current information detected by the current information means at a moment when the subordinate switching element is turned on, and supplying a current information holding signal, which makes an adjustment so as to advance the timing of the rise of the set signal, to the output side or the interior of the differential amplification stage.

2. The switching power supply circuit according to claim 1, wherein
   the current information means outputs a first voltage representing the current information when the subordinate switching element is turned on, by a current detecting signal which becomes ON simultaneously with or immediately after turning-on of the subordinate switching element and which becomes OFF simultaneously with or immediately before turning-off of the subordinate switching element.

3. The switching power supply circuit according to claim 2, wherein
   the current information holding means holds a second voltage representing the current information when the subordinate switching element is turned on, by a current holding and detecting signal which becomes ON at a time when the current detecting signal becomes OFF, and which becomes OFF a predetermined short time after the current detecting signal becomes ON.

4. The switching power supply circuit according to claim 2, wherein
   the current information holding means holds a second voltage representing the current information when the subordinate switching element is turned on, by a current holding and detecting signal which becomes ON simultaneously with a time when the current detecting signal becomes ON, and which becomes OFF a predetermined short time after the current detecting signal becomes ON.

5. The switching power supply circuit according to claim 3, wherein
   the current information detecting means has a first MOSFET whose source is connected via a first resistor to a power supply procured beforehand, the first voltage is applied to a gate of the first MOSFET, and a drain of the first MOSFET is connected to the output side or the interior of the differential amplification stage, and
   the current information holding means has a second MOSFET whose source is connected via a second resistor to a power supply procured beforehand, the second voltage is applied to a gate of the second MOSFET, and a drain of the second MOSFET is connected to the output side or the interior of the differential amplification stage.

6. The switching power supply circuit according to claim 4, wherein
   the current information detecting means has a first MOSFET whose source is connected via a first resistor to a power supply procured beforehand, the first voltage is applied to a gate of the first MOSFET, and a drain of the first MOSFET is connected to the output side or the interior of the differential amplification stage, and
   the current information holding means has a second MOSFET whose source is connected via a second resistor to a power supply procured beforehand, the second voltage is applied to a gate of the second MOSFET, and a drain of the second MOSFET is connected to the output side or the interior of the differential amplification stage.

7. The switching power supply circuit according to claim 3, wherein the current information detecting means has a first transconductance amplifier to whose input side the first voltage is applied, and an output side of the first transconductance amplifier is connected to the output side or the interior of the differential amplification stage, and the current information holding means has a second transconductance amplifier to whose input side the second voltage is applied, and an output side of the second transconductance amplifier is connected to the output side or the interior of the differential amplification stage.

8. The switching power supply circuit according to claim 4, wherein the current information detecting means has a first transconductance amplifier to whose input side the first voltage is applied, and an output side of the first transconductance amplifier is connected to the output side or the interior of the differential amplification stage, and the current information holding means has a second transconductance amplifier to whose input side the second voltage is applied, and an output side of the second transconductance amplifier is connected to the output side or the interior of the differential amplification stage.

\* \* \* \* \*